United States Patent
Goldstein et al.

(10) Patent No.: US 11,822,654 B2
(45) Date of Patent: Nov. 21, 2023

(54) SYSTEM AND METHOD FOR RUNTIME DETECTION, ANALYSIS AND SIGNATURE DETERMINATION OF OBFUSCATED MALICIOUS CODE

(71) Applicant: Morphisec Information Security 2014 Ltd., Beer-Sheva (IL)

(72) Inventors: Evgeny Goldstein, Petah Tikva (IL); Michael Gorelik, West Newton, MA (US); Mordechai Guri, Nof Ayalon (IL); Ronen Yehoshua, Matan (IL)

(73) Assignee: Morphisec Information Security 2014 Ltd., Beer Sheva (IL)

( * ) Notice: Subject to any disclaimer, the term of this patent is extended or adjusted under 35 U.S.C. 154(b) by 145 days.

(21) Appl. No.: 16/606,156

(22) PCT Filed: Apr. 20, 2018

(86) PCT No.: PCT/IB2018/052785
§ 371 (c)(1),
(2) Date: Oct. 17, 2019

(87) PCT Pub. No.: WO2018/193429
PCT Pub. Date: Oct. 25, 2018

(65) Prior Publication Data
US 2020/0342100 A1    Oct. 29, 2020

Related U.S. Application Data

(60) Provisional application No. 62/487,834, filed on Apr. 20, 2017.

(51) Int. Cl.
*G06F 21/56* (2013.01)
*G06F 21/55* (2013.01)
(Continued)

(52) U.S. Cl.
CPC ............ *G06F 21/563* (2013.01); *G06F 21/52* (2013.01); *G06F 21/554* (2013.01); *G06F 21/56* (2013.01);
(Continued)

(58) Field of Classification Search
CPC ........ G06F 21/55; G06F 21/554; G06F 21/56; G06F 21/562; G06F 21/563;
(Continued)

(56) References Cited

U.S. PATENT DOCUMENTS 7,568,233 B1    7/2009  Szor et al.
9,710,646 B1 *  7/2017  Zhang ..................... G06F 21/56
(Continued)

FOREIGN PATENT DOCUMENTS

EP      3612969         2/2020
WO      2016079602 A1   5/2016
WO      2018193429 A1   10/2018

OTHER PUBLICATIONS

International Search Report and Written Opinion received for PCT Patent Application No. PCT/IB2018/052785, dated Jul. 16, 2018, 15 pages.

(Continued)

*Primary Examiner* — D'Arcy Winston Straub
(74) *Attorney, Agent, or Firm* — PEARL COHEN ZEDEK LATZER BARATZ LLP

(57) ABSTRACT

Embodiments described herein enable the detection, analysis and signature determination of obfuscated malicious code. Such malicious code comprises a deobfuscation portion that deobfuscates the obfuscated portion during runtime to generate deobfuscated malicious code. The techniques described herein deterministically detect and suspend the deobfuscated malicious code when it attempts to access memory resources that have been morphed in accordance with embodiments described herein. This advantageously enables the deobfuscated malicious code to be suspended at its initial phase. By doing so, the malicious code is not given the opportunity to delete its traces in memory regions it accesses, thereby enabling the automated exploration of such memory regions to locate and extract runtime memory (Continued)

characteristics associated with the malicious code. Such characteristics may be analyzed to automatically determine indicators of compromise, which can be used as signatures of the malicious code for subsequent runtime detection of malicious code.

22 Claims, 6 Drawing Sheets

(51) Int. Cl.
*G06F 21/52* (2013.01)
*H04L 9/40* (2022.01)

(52) U.S. Cl.
CPC .......... *G06F 21/564* (2013.01); *G06F 21/566* (2013.01); *H04L 63/145* (2013.01); *G06F 2221/033* (2013.01); *G06F 2221/2125* (2013.01)

(58) Field of Classification Search
CPC ................. G06F 21/564; G06F 21/566; G06F 2221/033; G06F 2221/2125
See application file for complete search history.

(56) References Cited

U.S. PATENT DOCUMENTS

| | | | |
|---|---|---|---|
| 2007/0250930 A1 | 10/2007 | Aziz et al. | |
| 2008/0184367 A1 | 7/2008 | Mcmillan et al. | |
| 2012/0079596 A1* | 3/2012 | Thomas | G06F 21/565 726/24 |
| 2012/0167218 A1* | 6/2012 | Poornachandran | G06F 21/566 726/24 |
| 2012/0254995 A1* | 10/2012 | Sallam | G06F 21/52 726/22 |
| 2013/0139264 A1 | 5/2013 | Brinkley et al. | |
| 2014/0109170 A1* | 4/2014 | Nemiroff | G06F 21/78 726/1 |
| 2014/0283076 A1* | 9/2014 | Muttik | G06F 21/566 726/24 |
| 2016/0196431 A1 | 7/2016 | Lu | |
| 2016/0381043 A1* | 12/2016 | Yamada | G06F 21/554 726/23 |
| 2017/0093897 A1* | 3/2017 | Cochin | H04L 63/145 |
| 2018/0114018 A1* | 4/2018 | Zhang | G06F 21/562 |
| 2018/0253549 A1* | 9/2018 | Yavo | G06F 21/53 |

OTHER PUBLICATIONS

International Preliminary Report on Patentability received for PCT Application No. PCT/IB2018/052785, dated Oct. 31, 2019, 9 pages.
Office Action received for European Patent Application No. 18722734.3, dated Dec. 1, 2021, 6 pages.
Office Action received for Israel Patent Application No. 270037, dated Nov. 15, 2021, 6 pages (3 pages of English Translation and 3 pages of Official Copy).
Office Action received for Israel Patent Application No. 270037, dated Jan. 12, 2023, 7 pages (4 pages of English Translation and 3 pages of Official Copy).

* cited by examiner

SYSTEM AND METHOD FOR RUNTIME DETECTION, ANALYSIS AND SIGNATURE DETERMINATION OF OBFUSCATED MALICIOUS CODE

CROSS REFERENCE TO RELATED APPLICATION

This application is a U.S. national phase application of PCT/IB2018/052785, filed on Apr. 20, 2018, and entitled "System and Method for Runtime Detection, Analysis and Signature Determination of Obfuscated Malicious code", which claims priority to U.S. Provisional Application Ser. No. 62/487,834, filed Apr. 20, 2017, entitled "System and Method for Runtime Detection, Identification, and Fingerprinting of Encrypted and/or Obfuscated Malicious Code", the entireties of which are incorporated by reference herein.

BACKGROUND

Technical Field

Embodiments described herein generally relate to detecting, analyzing and/or determining signatures for malicious code or other security threats on computer systems.

Description of Related Art

Modern malicious code goes beyond traditional malware, and is notoriously harder to detect by ordinary anti-malware techniques. Unlike traditional malware, the implementation of malicious code does not require an executable file written to the hard disk of the target computer. Consequently, ordinary anti-malware programs that rely on scanning new files as they are downloaded, and trying to find a match with some static malware signature, are ineffective since there is no file to scan. In some cases, the malicious code is hidden within a data file such as a PDF (Portable Document Format) file. Although in such cases the anti-malware program may scan the file, the malicious code may exploit some hitherto unknown vulnerability in the application that opens the file (e.g., a PDF reader or other similar programs), thereby rendering the malicious code undetectable by traditional anti-malware programs. Furthermore, unlike executable files, ubiquitous data files are not blocked automatically by prevailing email providers. In other cases, the malicious code resides on a Web server, waiting for an incautious surfer, and exploits vulnerabilities in the user's browser or a browser's plugin. In yet other cases, the malicious code resides on a remote machine and exploits a vulnerability in some networking service available on the target computer.

Typical implementations of malicious code involve code injection, where a vulnerability in a program is exploited to inject external code into a running process on the target computer. Once the external, malicious code is successfully injected into the process, it executes under the identity of that process. Subsequently, it may proceed by performing one or more types of malicious activities or serving as a backdoor for various types of malicious payloads.

Other implementations may involve the use of Just-in-Time (JIT) compiled shellcode. JIT compiled shellcodes may be generated by high-level languages such as JavaScript, VBScript, Actionscript, .NET, JAVA, C++, etc., and use intermediate language during execution thereof. Such malicious code may be encrypted and/or obfuscated in order to evade static analysis tools. The malicious code may look statically different in each instance, thereby making it difficult to detect, identify and analyze it.

BRIEF SUMMARY

Methods, systems, and apparatuses are described for detecting, analyzing and/or determining signatures malicious code or other security threats on computer systems, substantially as shown in and/or described herein in connection with at least one of the figures, as set forth more completely in the claims.

BRIEF DESCRIPTION OF THE DRAWINGS

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
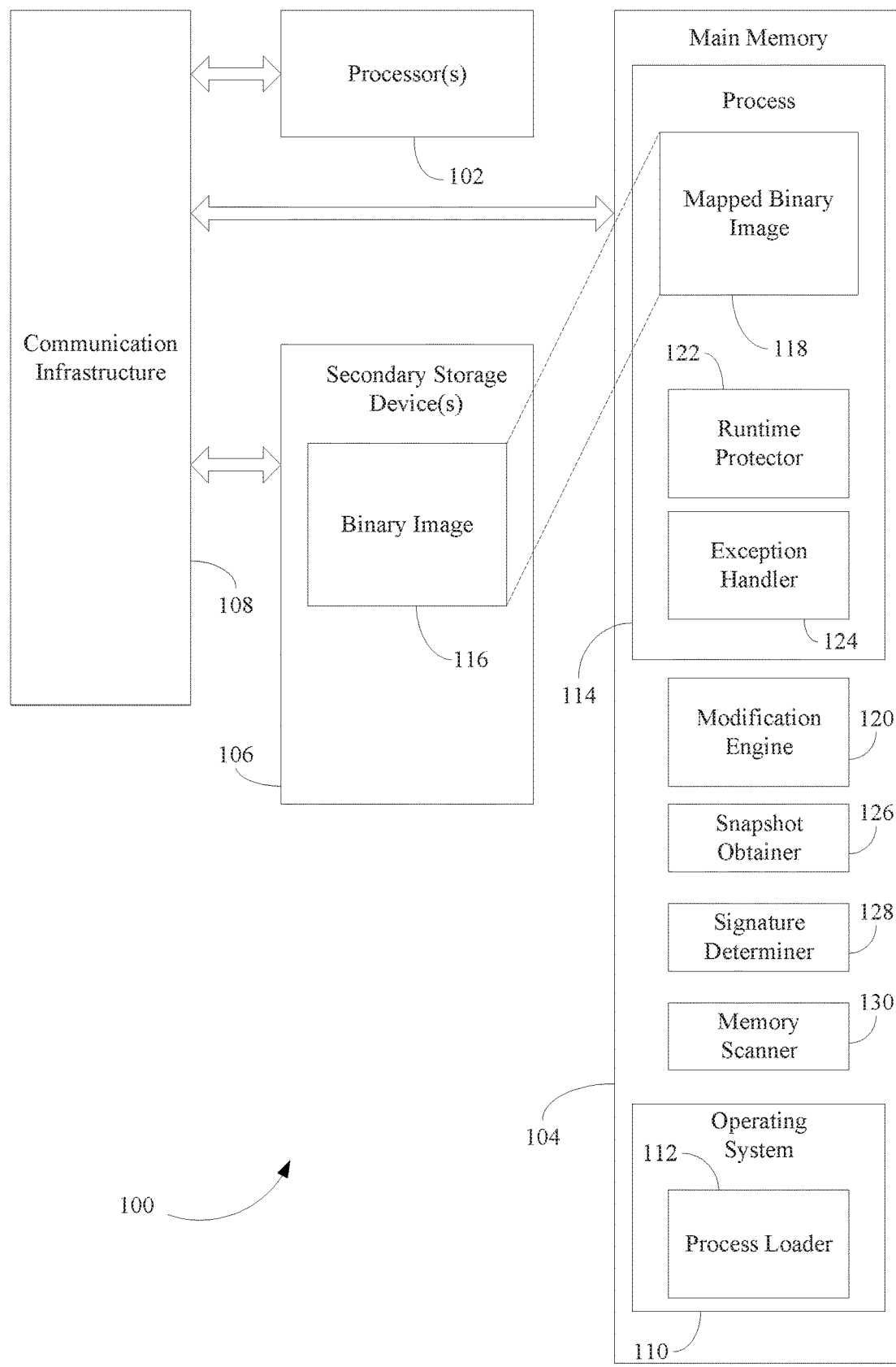
FIG. 1 depicts components of a computer system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Numerous exemplary embodiments are now described. The section/subsection headings utilized herein are not intended to be limiting. Embodiments are described throughout this document, and any type of embodiment may be included under any section/subsection. Furthermore, it is contemplated that the disclosed embodiments may be combined with each other in any manner.

II. Example Embodiments

Embodiments described herein enable the detection, analysis, and signature determination of malicious code (e.g., JIT shellcode) that attempts to evade static analysis tools via obfuscation (e.g., encryption). Such malicious code comprises a deobfuscation portion that deobfuscates the obfuscated portion during runtime to generate deobfuscated malicious code. The techniques described herein deterministically detect and suspend the deobfuscated malicious code when it attempts to access memory resources that have been morphed in accordance with embodiments described herein. This advantageously enables the deobfuscated malicious code to be suspended at an initial phase of execution, before the deobfuscated malicious code executes its exploits and before its process is terminated. By doing so, the malicious code is not given the opportunity to delete its traces in memory regions it accesses, thereby enabling the automated exploration of such memory regions to locate and automatically extract runtime memory characteristics associated with the malicious code. Such characteristics may be automatically analyzed to determine indicators of compromise, which can be used as signatures of the malicious code for subsequent runtime detection of malicious code.

In particular, a method performed by a computing device for identifying malicious code comprising a deobfuscator and an obfuscated portion, the deobfuscator configured to deobfuscate the obfuscated portion to generate a deobfuscated portion during execution of the deobfuscator, is described herein. The method includes: detecting that the deobfuscated portion of the malicious code has accessed a particular region of memory designated as being non-accessible; suspending execution of the deobfuscated portion of the malicious code in response to the detecting; and obtaining a snapshot of runtime characteristics of at least one of the deobfuscator or the deobfuscated portion of the malicious code in response to the suspending, wherein one or more indicators of compromise that indicate the presence of the malicious code on the computing device are automatically determined based on an analysis of the snapshot, and wherein one or more signatures are determined based on the automatically determined one or more indicators of compromise, the one or more signatures being utilized for subsequent detection of malicious code.

In accordance with one or more embodiments, the automatically determined one or more indicators of compromise comprise one or more dynamic indicators of compromise that include: an access caused by the deobfuscated portion to one or more resources of an operating system executing on the computing device, the one or more resources comprising: at least one file or directory of a file system maintained by the operating system or an application programming interface (API) for accessing the file system; at least one registry key or value of a registry maintained by the operating system or an API for accessing the registry; at least one of a process or thread maintained by the operating system or an API for manipulating at least one of the process or thread; one or more explicitly-loaded modules or an API for explicitly loading the modules; one or more delay-loaded modules or an API for delay-loading the modules; one or more APIs for accessing one or more user privileges or profiles; one or more mutexes maintained by the operating system or an API for accessing the one or more mutexes; one or more environment variables maintained by the operating system or an API for accessing the one or more environment variables; one or more APIs for performing one or more cryptographic primitives (e.g., low-level cryptographic algorithms); or network activity caused by the deobfuscated portion and performed by the computing device or an API for performing the network activity or for accessing network parameters utilized for performing the network activity; and a change in entropy of one or more code sections of the memory after execution of the deobfuscated portion of the malicious code.

In accordance with one or more embodiments, the automatically determined one or more indicators of compromise comprise one or more static indicators of compromise that include at least one string, metadata or byte sequence associated with at least one of the deobfuscator or the deobfuscated portion.

In accordance with one or more embodiments, the method further comprises: determining a deobfuscation scheme utilized by the deobfuscator to generate the deobfuscated portion of the malicious code based on the analyzing.

In accordance with one or more embodiments, the malicious code is Just-in-Time compiled shellcode.

In accordance with one or more embodiments, the obfuscated portion of the malicious code is encrypted, and wherein the deobfuscator is configured to decrypt the obfuscated portion.

In accordance with one or more embodiments, the method further comprises: determining an invariant portion of the malicious code that remains unchanged across multiple executions of the malicious code, wherein the one or more signatures is based on the invariant portion of the malicious code.

In accordance with one or more embodiments, the one or more signatures comprise the one or more static indicators of compromise.

In accordance with one or more embodiments, the runtime characteristics comprise at least one of: register values at the time of suspending of a particular thread associated with the malicious code; a number of sequential function calls that occurred prior to suspending of a particular thread associated with the malicious code; a listing of library modules loaded at the time of the suspending; a listing of file handles opened at the time of the suspending; or at least a partial memory dump at the time of the suspending.

A computer system for identifying malicious code comprising a deobfuscator and an obfuscated portion, the deobfuscator configured to deobfuscate the obfuscated portion to generate a deobfuscated portion during execution of the deobfuscator, is also described herein. The computer system comprises: one or more processing circuits; and a memory coupled to the one or more processing circuits, the memory storing program code configured to be executed by the one or more processing circuits, the program code comprising: a runtime protector configured to: detect that the deobfuscated portion of the malicious code has accessed a particular region of the memory designated as being non-accessible; and suspend execution of the deobfuscated portion of the malicious code in response to the detecting; and a snapshot obtainer configured to: obtain a snapshot of runtime characteristics of at least one of the deobfuscator or the deobfuscated portion of the malicious code in response to the suspending, wherein one or more indicators of compromise that indicate the presence of the malicious code on the computer system are automatically determined based on an analysis of the snapshot, and wherein one or more signatures are determined based on the automatically determined one or more indicators of compromise, the one or more signatures being utilized for subsequent detection of malicious code.

In accordance with one or more embodiments, the automatically determined one or more indicators of compromise comprise one or more dynamic indicators of compromise that include: an access caused by the deobfuscated portion to one or more resources of an operating system executing on the computing device, the one or more resources comprising: at least one file or directory of a file system maintained by the operating system or an application programming interface (API) for accessing the file system; at least one registry key or value of a registry maintained by the operating system or an API for accessing the registry; at least one of a process or thread maintained by the operating system or an API for manipulating at least one of the process or thread; one or more explicitly-loaded modules or an API for explicitly loading the modules; one or more delay-loaded modules or an API for delay-loading the modules; one or more APIs for accessing one or more user privileges or profiles; one or more mutexes maintained by the operating system or an API for accessing the one or more mutexes; one or more environment variables maintained by the operating system or an API for accessing the one or more environment variables; one or more APIs for performing one or more cryptographic primitives; or network activity caused by the deobfuscated portion and performed by the computing device or an API for performing the network activity or for accessing network parameters utilized for performing the network activity; and a change in entropy of one or more code sections of the memory after execution of the deobfuscated portion of the malicious code.

In accordance with one or more embodiments, the automatically determined one or more indicators of compromise comprise one or more static indicators of compromise that include at least one string, metadata or byte sequence associated with at least one of the deobfuscator or the deobfuscated portion.

In accordance with one or more embodiments, a deobfuscation scheme utilized by the deobfuscator to generate the deobfuscated portion of the malicious code is determined based on the analysis of the snapshot.

In accordance with one or more embodiments, the malicious code is Just-in-Time compile shellcode.

In accordance with one or more embodiments, the obfuscated portion of the malicious code is encrypted, and wherein the deobfuscator is configured to decrypt the obfuscated portion.

In accordance with one or more embodiments, an invariant portion of the malicious code that remains unchanged across multiple executions of the malicious code is determined, wherein the one or more signatures is based on the invariant portion of the malicious code.

In accordance with one or more embodiments, the one or more signatures comprise the one or more static indicators of compromise.

In accordance with one or more embodiments, the runtime characteristics comprise at least one of: register values at the time of suspending of a particular thread associated with the malicious code; a number of sequential function calls that occurred prior to suspending of a particular thread associated with the malicious code; a listing of library modules loaded at the time of the suspending; a listing of file handles opened at the time of the suspending; or at least a partial memory dump at the time of the suspending.

A computer-readable storage medium having program instructions recorded thereon that, when executed by at least one processor circuit of a computing device, perform a method for identifying malicious code comprising a deobfuscator and an obfuscated portion, the deobfuscator configured to deobfuscate the obfuscated portion to generate a deobfuscated portion during execution of the deobfuscator, is further described herein. The method includes: detecting that the deobfuscated portion of the malicious code has accessed a particular region of memory designated as being non-accessible; suspending execution of the deobfuscated portion of the malicious code in response to the detecting; and obtaining a snapshot of runtime characteristics of at least one of the deobfuscator or the deobfuscated portion of the malicious code in response to the suspending, wherein one or more indicators of compromise that indicate the presence of the malicious code on the computing device are automatically determined based on an analysis of the snapshot, and wherein one or more signatures are determined based on the automatically determined one or more indicators of compromise, the one or more signatures being utilized for subsequent detection of malicious code.

In accordance with one or more embodiments, the automatically determined one or more indicators of compromise comprise one or more dynamic indicators of compromise that include: an access caused by the deobfuscated portion to one or more resources of an operating system executing on the computing device, the one or more resources comprising: at least one file or directory of a file system maintained by the operating system or an application programming interface (API) for accessing the file system; at least one registry key or value of a registry maintained by the operating system or an API for accessing the registry; at least one of a process or thread maintained by the operating system or an API for manipulating at least one of the process or thread; one or more explicitly-loaded modules or an API for explicitly loading the modules; one or more delay-loaded modules or an API for delay-loading the modules; one or more APIs for accessing one or more user privileges or profiles; one or more mutexes maintained by the operating system or an API for accessing the one or more mutexes; one or more environment variables maintained by the operating system or an API for accessing the one or more environment variables; one or more APIs for performing one or more cryptographic primitives; or network activity caused by the deobfuscated portion and performed by the computing device or an API for performing the network activity or for accessing network parameters utilized for performing the network activity; and a change in entropy of one or more code sections of the memory after execution of the deobfuscated portion of the malicious code.

III. Example Systems and Methods for Detecting, Analyzing and/or Determining Signatures for Obfuscated Malicious Code Various approaches are described herein for the automated detection, analysis, and/or signature determination of one or more exploits based on runtime memory characteristics associated with the process in which the exploit(s) are attempted.

Subsection A describes systems and techniques for detecting and/or neutralizing malicious code or other security threats on computer systems based on process modification in accordance with embodiments. Subsection B describes systems and techniques for analyzing and determining signatures for the neutralized malicious code or other security threats on computer systems in accordance with embodiments. It is noted that the systems and techniques for analyzing and determining signatures for neutralized malicious code or other security threats described in Subsection B may be performed in systems other than those described in Subsection A. In particular, the systems and techniques for analyzing and determining signatures for neutralized malicious code or other security threats described in Subsection B may be used in conjunction with any systems or techniques that are suitable for detecting and/or neutralizing malicious code or other security threats.

A. Detecting and/or Neutralizing Malicious Code or Other Security Threats on Computer Systems Malicious code (e.g., malware) including injected shellcode (e.g., JIT shellcode), relies on some basic assumptions regarding the runtime context of the target in order to initialize itself and to execute its payload properly. In general, malicious code injected into a running process has to perform some initial steps before it can proceed. It should perform at least some of the initiation steps that the system's default loader would normally perform when creating a running process from an executable file (e.g., a binary image). In particular, it is crucial for the injected code to obtain the addresses of certain shared libraries (e.g., dynamic-link libraries (DLLs)) as they are mapped into the address space of the running process, and to further obtain the addresses of the procedures (or functions) that it intends to use. In the case where the vulnerability resides inside a shared library, the injected code only needs to find the specific functionality within that library and does not need to locate the library itself.

Various approaches are described herein for, among other things, neutralizing and/or detecting attacks by such malicious code. This may be achieved, for example, by modifying one or more instances of a protected process upon loading by injecting a runtime protector that (a) creates a copy of each of the process' imported libraries and maps the copy into a random address inside the process' address space (to form a randomized "shadow" library), (b) replaces the procedure addresses within the original libraries, to point at a stub (thereby forming a "stub" library), (c) intercepts procedure calls for late library loading and creates a shadow library and a stub library for such libraries, and (d) enabling non-malicious code to work with the "shadow" library to continue the flow of the non-malicious code.

The above technique is referred to herein as "morphing." In one implementation of this technique, the addresses of the shadow libraries (and procedures included therein) are randomized, ensuring that each process and each process's instance obtain a unique protective shield. In accordance with an embodiment, morphing is performed dynamically during initialization of the process, where library(ies) loaded during process initialized are morphed. In accordance with another embodiment, morphing is performed dynamically during runtime, where library(ies) loaded during runtime (i.e., after process initialization is complete) are morphed.

In further accordance with this technique, when injected (e.g., malicious) code attempts to retrieve the address of a given procedure, it will be directed to the stub library (the library at the original address) and receive the address of the stub procedure. Consequently, the injected code will not be able to perform its malicious activities. Furthermore, its presence can be detected. However, when the original program's code (e.g., the non-malicious code) attempts to retrieve the address of a procedure, it will use the address of the shadow library and receive the correct address of the requested procedure. Consequently, the original program's code will proceed normally.

Various embodiments described herein offer at least the following additional advantages: (a) when the presence of malicious code is detected, the malicious code can be sandboxed or otherwise diverted to a secure environment, to deceive the attacker and/or to learn the malware's behavior and intentions; (b) a user or administrator can define, for a given process, a set of procedure calls that are prohibited under any circumstances (also referred to herein as an "API Firewall"); (c) the overall impact on the system's performance may be relatively low, particularly compared to runtime behavioral monitoring, which tries to detect malicious code rather than preempt it; and (d) no prior knowledge of the current malware is assumed, therefore prevention of new, unknown, or zero-day attacks is possible.

Furthermore, embodiments described herein overcome the limitations of address space layout randomization (ASLR) and data execution prevention (DEP), and can be applied in concert with those techniques to gain optimal protection.

For the sake of brevity, embodiments described herein are described in terms of the MICROSOFT® WINDOWS® Operating System (OS), published by Microsoft Corporation of Redmond, Wash. However, as should be clear to any person skilled in the art, this is just one possible embodiment. Similar embodiments may protect practically all kinds of modern operating systems, including LINUX® and other UNIX® variants, against a very wide array of malicious-code attacks, whether remote or local.

Additionally, embodiments described herein refer to morphing techniques associated with library(ies) for the sake of brevity. However, as should be clear to any person skilled in the art, this is just one possible embodiment. Similar embodiments may protect practically all kinds of codebase elements, including, but not limited to, DLL extensions, Component Object Models (COMs), process management objects, thread management objects, etc.

FIG. 1 depicts components of a computer system 100 in accordance with one embodiment that detects and/or neutralizes the execution of malicious code associated with a computing process executing thereon. In accordance with one embodiment, computer system 100 detects and/or neutralizes the execution of malicious code associated with a computing process executing thereon. Computer system 100 includes one or more processor(s) 102 (also called central processing units, or CPUs), a primary or main memory 104, and one or more secondary storage device(s) 106. Processor(s) 102, main memory 104 and secondary storage device(s) 106 are connected to a communication infrastructure 108 via a suitable interface, such as one or more communication buses or one or more networks (e.g., wireless or wired networks). In some embodiments, processor(s) 102 can simultaneously operate multiple computing threads, and in some embodiments, processor(s) 102 may each comprise one or more processor core(s). Examples of main memory 104 include a random access memory (RAM) (e.g., dynamic RAM (DRAM), synchronous DRAM (SDRAM), dual-data rate RAM (DDRRAM), etc.). Secondary storage device(s) 106 may include for example, one or more hard disk drives, one or more memory cards, one or more memory sticks, a floppy disk, magnetic tape, compact disk, DVD, optical storage disk, or any other computer data storage device (each of which may be connected to respective device and/or interface for reading and/or writing data thereto).

As shown in FIG. 1, main memory 104 stores an operating system 110. Operating system 110 may manage one or more hardware components (e.g., processor(s) 102, main memory 104, secondary storage device(s) 106, etc.) and software executing on computer system 100. Example hardware components of first computer system 100 are described in detail below in reference to FIG. 7.

Operating system 110 may include one or more components that perform certain tasks relating to the execution of software on computer system 100. One such component is a process loader 112. Process loader 112 is configured to initiate the creation of a computing process (or "process") 114 in main memory 104. Process 114 is an instance of a computer program being executed by processor(s) 102. The computer program may comprise an application program (or "application"), a system program, or other computer program being executed by processor(s) 102. The computer program is embodied in instructions and/or data included in a binary image (e.g., binary image 116).

To initiate the creation of process 114, process loader 112 loads (or "maps") binary image 116, which is stored in secondary storage device(s) 106, into an address space allocated for process 114 in main memory 104 based on information included in binary image 116. The binary image mapped into main memory 104 is represented in FIG. 1 by mapped binary image 118. Process loader 112 builds up an initial execution context of process 114. Computer program execution (i.e., process 114) begins when processor(s) 102 commence executing the first instruction of the computer program. Process 114 may comprise one or more threads of execution that execute a subset of instructions concurrently.

As the program execution evolves, other component(s) of operating system 110 allocate various resources to process 114. The execution context of process 114 may comprise information about such resource allocation, a current state of the program execution, an instruction that is to be executed next, and other information related to the program execution. The computer program execution continues until processor(s) 102 execute a termination or suspend instruction.

Additional information regarding the information included in binary image 116 and how process loader 112 maps binary image 116 into main memory 104 based on this information is described below with reference to FIG. 2.

Figure 2:
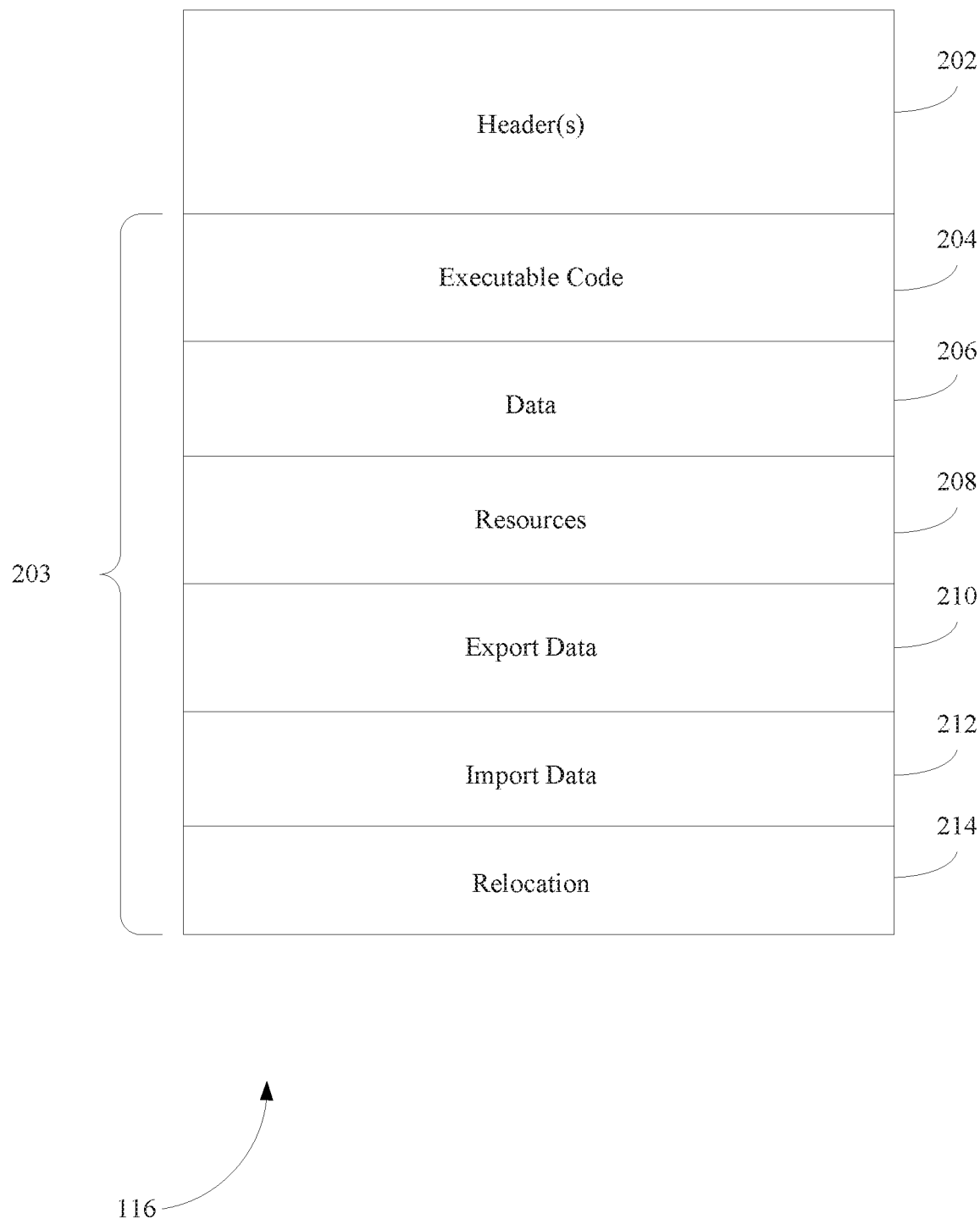
FIG. 2 depicts a layout of a binary image in accordance with an embodiment.

FIG. 2 is an example layout of binary image 116 in accordance with an embodiment. Examples of executable binary formats for binary image 116 include, but are not limited to, the portable executable (PE) format (e.g., files having an .exe, .dll, and a .sys extension), the Executable and Linkable Format (ELF), the Mach object (Mach-O) file format, etc.

As shown in FIG. 2, binary image 116 may comprise one or more headers 202 and/or one or more sections 203, which process loader 112 uses to map binary image 116 (or portions thereof) into main memory 104. Header(s) 202 may comprise information regarding the layout and properties of binary image 116 (e.g., the names, number and/or location of section(s) 203 within binary image 116). Header(s) 202 may also include a base address (also referred to as an image base) that specifies a default address at which binary image 116 is to be loaded into main memory 104. It is noted, however, that binary image 116 may be loaded at a different address. For example, if operating system 110 supports ASLR (which is technique used to guard against certain buffer-overflow based attacks and ROP (return oriented programming) shellcodes by randomizing the location where binary images and its modules are loaded into main memory 104), the address at which binary image 116 is loaded into main memory 104 will be a randomized address.

Section(s) 203 of binary image 116 may comprise an executable code section 204, a data section 206, a resources section 208, an export data section 210, an import data section 212 and a relocation section 214. Executable code section 204 comprises instructions that correspond to the computer program to be executed by processor(s) 102. The instructions may be machine code instructions that are to be executed by processor(s) 102 after binary image 116 is loaded into main memory 104.

Data section 206 comprises uninitialized data required for executing the computer program. Such data includes, but is not limited to, static and/or global variables. Resources section 208 comprises resource information that comprises read-only data required for executing the computer program. Such read-only data includes, but is not limited to, icons, images, menus, strings, etc. The read-only data may be stored in one or more tables (i.e., resource table(s)).

Export data section 210 may include information about the names and/or references of procedures exportable to other binary image(s) (e.g., DLL(s)). The export data may include an export directory that defines the names of exportable procedures included in binary image 116. The addresses of the exportable procedures may be stored in a table (e.g., an export address table (EAT)). The addresses of such exportable procedures may be provided to other binary images in response to the issuance by such other binary images of a procedure call (e.g., GetProcAddress) that identifies the procedure.

Import data section 212 may include information about the names and/or references of procedures that are imported by binary image 116. Import data section 212 may comprise an import directory, which includes information about other binary image(s) (e.g., DLL(s)) from which binary image 116 imports procedures. The information may include a location (e.g., an address) or a pointer to a location of a binary image that includes at least one procedure to be imported. The information may further include an import address table (IAT) that includes the name(s) of procedures to be imported and/or pointers to the procedures to be imported.

During process loading, process loader 112 may check the import data (e.g., the IAT) to determine if one or more additional binary images (e.g., libraries, such as DLLs) are required for process 114. Process loader 112 may map any such required binary image(s) into the address space of process 114. Process loader 114 may recursively parse the respective IATs of each required binary image to determine if further binary image(s) are required and map these further binary image(s) into the address space of process 114.

Process loader 112 replaces the pointers in the respective IATs with the actual addresses at which the procedures are loaded into main memory 104 as the procedures are imported. By using pointers, process loader 112 does not need to change the addresses of imported procedures everywhere in code of the computer program that such imported procedures are called. Instead, process loader 112 simply has to add the correct address(es) to a single place (i.e., the IAT), which is referenced by the code.

Relocation data section 214 comprises relocation data that enables process loader 112 to modify addresses associated with code and data items (respectively included in executable code section 204 and data section 206) specified in binary image 116. When a binary image is created (e.g., by a computer program, such as a linker), an assumption is made that the binary image is to be mapped to a base address, as described above. Based on this assumption, the linker inserts the real addresses (relative to the base address) of code and data items in the binary image. If for some reason the binary image is loaded at an address other than the image base (e.g., in the event that the image base is already occupied or due to an ASLR scheme being in place), these real addresses will be invalid. The relocation data enables process loader 112 to modify these addresses in binary image 116 so that they are valid. For example, the relocation data may include a relocation table, which includes a list of pointers that each point to a real address of a code and/or data item. When binary image 116 is remapped to an address other than the image base, process loader 112 updates these pointers. Thereafter, process loader 112 initiates the computer program by passing control to the program code loaded into main memory 104.

Returning to FIG. 1, in accordance with an embodiment, system 100 is configured to neutralize and/or intercept runtime in-memory exploits of processes (e.g., exploits performed by malicious code). Such exploits are carried out by identifying the memory location of a specific known object (e.g., of a procedure or data object having a predetermined fixed address) in a process's address space in main memory and using this location to calculate the location of other procedures that are required to fulfill the exploit.

To neutralize such exploits, computer system 100 may include a modification engine 120, which executes in main memory 104. Modification engine 120 may be configured to modify (or "morph") process 114 to include a runtime protector 122 that causes the location of the in-memory data and code segments to be changed upon being loaded into main memory 104 in a random manner and updates legitimate code elements (i.e., addresses, pointers, etc.) with these changes, thereby preventing malicious code from accessing such data and code segments. Furthermore, runtime protector 122 maintains the original in-memory data and code skeletons and intercepts any access to these segments to detect malicious activity.

For example, modification engine 120 may be configured to intercept a process creation event issued by operating system 110 (or a component thereof) for process 114. Modification engine 120 may verify that process 114 is designated for protection. For example, modification engine 120 may check that process 114 is included in a list of processes that should be protected. In response to determining that process 114 is to be protected, modification engine 120 causes the creation of the process to be suspended and injects runtime protector 122 into process 114. Runtime protector 122 may be a library (e.g., a DLL) that is injected into the address space of process 114.

Runtime protector 122 may be configured to determine whether any library modules (e.g., DLLs) have already been loaded into the address space of process 114. In response to determining that library module(s) have already been loaded into the address space of process 114, runtime protector 122 copies the library module(s) into a different, random memory range (referred to as a "shadow" library). The library module(s) loaded into the original address space are modified into a stub library (also referred to as a "shallow library"), which provides stub procedures or functions. Runtime protector 122 updates the IAT mapped into the address space of process 114 with the addresses corresponding to the random memory range. Thereafter, modification engine 120 causes process loader 112 to be released to allow process loader 112 to finalize the process creation for process 114.

Runtime protector 122 may also be configured to create shadow and stub libraries for library module(s) that are loaded after process finalization (e.g., "late" libraries). For example, runtime protector 122 may be configured to hook memory mapping procedure calls (e.g., that map libraries to a particular section of main memory 104, such as NtMapViewOfSection) that load "late" library module(s) into main memory 104. Upon intercepting such procedure calls, runtime protector 122 allows the call to be completed, thereby resulting in the library module(s) being loaded at their intended addresses in main memory 104. Thereafter, runtime protector 122 creates shadow and stub libraries for such library module(s) in a similar manner as described above.

Thus, when the original, non-malicious code attempts to retrieve a library module handle of a library module including the procedure requested for and/or the address of the procedure in one of the library module(s), it will receive the library module handle of the shadow library module and/or the address of the procedure in the shadow library module. Consequently, the original program's code will proceed normally as planned. However, when malicious code attempts to retrieve the library module handle of the same library module including the same procedure and/or the address of the procedure in the library module, the malicious code will receive the library module handle of the stub library module and/or the address of a procedure in the stub library module. Consequently, the malicious code will not be able perform its malicious activities.

In addition, the presence of the malicious code may be detected upon accessing the stub library. For example, in accordance with an embodiment, runtime protector 122 modifies the library module(s) loaded into the original address space into stub libraries by causing operating system 110 to designate the original address spaces at which executable portions (e.g., executable code) of the library module(s) are located as being non-accessible regions. Modification engine 120 may also inject an exception handler 124 into the address space of process 114, which intercepts an exception thrown by operating system 110 when code (e.g., malicious code) attempts to access the non-accessible region (i.e., the stub library). Upon detecting the exception, runtime protector 122 may be configured to suspend execution of the malicious code. By suspending execution of the malicious code, the data stored in memory and data structures maintained therein, such as targeted process's call stack, heap, etc., are maintained and accessible for analysis thereof (whereas if the malicious code were terminated, the call stack would be empty).

In accordance with an embodiment, malicious code is detected by a user-configurable API firewall. For example, a user or administrator may be enabled (e.g., using a graphical user interface (GUI)) to define, for any given process, a set of procedure calls that are prohibited under any circumstances.

B. Analysis and Signature Determination of Neutralized Malicious Code or Other Security Threats on Computer Systems The malicious code may comprise a portion that is intentionally obfuscated (e.g., encrypted) by the author of the code. This is done in an attempt to evade detection from anti-virus programs, malware detection programs, static analysis tools, etc. To enable execution of the obfuscated portion, the malicious code may further comprise a deobfuscator, which deobfuscates (e.g., decrypts) the obfuscated portion at runtime. For example, the deobfuscator may comprise the necessary decryption keys or other information to decrypt or deobfuscate the obfuscated code to generate deobfuscated code in accordance with a decryption or deobfuscation scheme (e.g., a ROR 13 algorithm). When the deobfuscated code attempts to execute, it accesses a morphed resource (e.g., a stub library) as described above with reference to Subsection A. The access causes operating system 110 to throw an exception, and runtime detector 122 suspends execution of the deobfuscated malicious code.

After execution of the deobfuscated malicious code is suspended, the memory of the targeted process (i.e., process 114) and/or other data structures, such as the targeted process's call stack or heap, may be automatically explored to obtain a snapshot of the targeted process. For example, computer system 100 may further include snapshot obtainer 126, which executes in main memory 104.

Snapshot obtainer 126 may be configured to obtain one or more snapshots of runtime characteristics of the deobfuscator and/or the deobfuscated portion of the malicious code after the malicious code is suspended. The snapshot(s) may indicate the state of process 114 and/or operating system 110 at the time execution of the deobfuscated malicious code was suspended. The obtained snapshot(s) may comprise one or more data items corresponding to a multitude of runtime environmental features or characteristics of process 114 and/or operating system 110, which include, but are not limited, (i) an order of function calls that are stored in one or more stack frames of a call stack maintained by operating system 110; (ii) function call(s) and/or parameter(s) stored in the stack frame(s) of the call stack to determine which function(s) were called up to the point of the attempted exploitation; (iii) return addresses of function call(s) stored in the call stack and/or code pointed by addresses stored in the call stack (iv) a number of sequential function calls from the module in which the attempted exploitation occurred prior to suspending of the malicious code (or a thread thereof); (v) a list of modules loaded into main memory 104 at the time execution of the malicious code was suspended; (vi) one or more values loaded into one or more registers of processor(s) 102 at the time execution of the malicious code (or a thread thereof) was suspended; (vii) a list of file handles that are open (which can be obtained, for example, by accessing tables in the kernel of operating system 110 that lists all the currently-opened files) at the time execution of the malicious code was suspended; (viii) a partial or full memory dump of main memory 104 at the time execution of the malicious code was suspended; (ix) contents of a call stack (e.g., function(s) called) associated with the user space (a region of main memory 104 allocated for user programs and/or processes) at the time execution of the malicious code was suspended; (x) contents of a call stack (e.g., function(s) called) associated with the kernel space (a region of main memory 104 allocated for the kernel of operating system 110) at the time execution of the malicious code was suspended; (xi) memory regions that have been allocated as result of the execution of the targeted process; (xii) other process state parameters (e.g., a number of threads, queues, events, loaded modules, etc.); and/or (xiii) the file containing the malicious code. Snapshot obtainer 126 provides the obtained snapshot(s) to signature determiner 128 for analysis thereby.

In accordance with an embodiment, signature determiner 128 may be included as part of computer system 100 (e.g., may be executing in memory 104 as shown in FIG. 1). In accordance with another embodiment, signature determiner 128 may be executing on a device that is remotely-located from and/or network-accessible to computer system 100.

Signature determiner 128 may analyze the snapshot(s) and identify one or more indicators of compromise that indicate the presence of malicious code on computer system 100. The indicator(s) of compromise may comprise static indicator(s) and/or dynamic indicator(s). Static indicator(s) are features or attributes of a malicious attack that can be correlated to static malicious files (e.g., files in which the malicious code are injected) that are created and/or stored on computer system 100. Examples of static indicator(s) include, but are not limited to, a string, metadata, one or more shellcode byte sequences, opcodes, or scripts associated with at least one of the deobfuscator or the deobfuscated portion, one or more import library dependencies associated with the deobfuscated portion, etc. The foregoing may be determined by analyzing the file in which the malicious code is included and/or the data structure(s) (e.g., the call stack(s) or heap(s)) associated with the targeted process (e.g., process 114) and/or one or more threads thereof and traversing through the data structure(s) and the memory addresses referenced therein.

The deobfuscator code may also be located and identified by traversing through the file in which the malicious code is included and/or the return addresses included in the data structure(s). Signature determiner 128 may analyze the deobfuscator code to determine the deobfuscation scheme utilized by the deobfuscator to deobfuscate the obfuscated portion of the malicious code.

Dynamic indicator(s) correspond to behavioral aspects or features of the deobfuscated portion that can be extracted from memory 114 during loadtime or runtime thereof. The dynamic indicator(s) may represent changes made by the malicious code to hardware and/or software components of computer system 100 (e.g., memory 104 (and/or data structures maintained therein), operating system 110 (and/or resources thereof), etc.). Examples of dynamic indicator(s) include, but are not limited to, an access (or an attempt thereof) caused by the deobfuscated portion to at least one registry key or value of a registry maintained by operating system 110 or an access to an API for accessing the registry, an access (or an attempt thereof) caused by the deobfuscated portion to a file or directory of a file system maintained by operating system 110 or an access to an API for accessing the file system, network activity (or an attempt thereof) or network parameters used for the network activity caused by the deobfuscated portion and performed by computer system 100 (e.g., a network connection with a computer (e.g., a server) that is remotely-located from the computer system 100), an access or a creation (or attempt thereof) caused by the deobfuscated portion of a thread and/or process maintained by operating system 110 or an access to an API for manipulating (e.g., creating, suspending, terminating, etc.) a thread and/or process, an access to an API for performing one or more cryptographic primitives (e.g., for decryption and/or encryption operations) caused by the deobfuscated portion with respect to a data object maintained by computer system 100, an access (or attempt thereof) caused by the deobfuscated portion to sensitive system resources maintained by computer system 100, such as, but not limited to, a digital certificate storage area, security identifiers (IDs), an access to an API for accessing user privileges or profiles, one or more explicitly-loaded modules or delay-loaded modules or an access to an API for explicitly loading or delay-loading the modules, an access (or an attempt thereof) caused by the deobfuscated portion to system data maintained by operating system 110 or an access to an API for accessing the system data, an access or creation (or an attempt thereof) caused by the deobfuscated portion of environment variables maintained by operating system 110 or an access to an API for accessing the environment variables, an access or creation (or an attempt thereof) caused by the deobfuscated portion of one or more mutexes maintained by operating system 110 or an access to an API for accessing the mutex(es), etc.

The dynamic indicator(s) may further represent a change in entropy of one or more code sections of the memory (or data structures maintained therein) after execution of the deobfuscator and/or deobfuscated portion of the malicious code. For instance, when the deobfuscator deobfuscates the obfuscated portion of the malicious code, the entropy of the memory (and/or data structures maintained therein) may change due to the deobfuscator writing various data sequences (e.g., certain sequence(s) of bytes) in the memory of the targeted process (i.e., process 114). For example, large blocks of the targeted process's heap may be allocated and written with the sequence of bytes. The exploit may attempt to control the flow of execution by causing the targeted process's code to reference the sequence of bytes stored at these locations in memory 104. Such a technique may be referred to as heap spraying. By analyzing the data structures, signature determiner 128 may determine which addresses in memory the sequence of bytes were written to and determine the entropy of those sections.

Dynamic indicator(s) may also include the pattern in which the sequence of bytes is written. For example, when malicious code performs a heap spraying technique, it may first build a code block that contains a large chunk of processor instructions. The code block may consist of two parts: a NOP-sled, which contains NOP processor instructions that induce execution to malicious shellcode, and shellcode. Second, the malicious code copies the code block to a plurality of memory locations. Signature determiner 128 may analyze the data structures to determine the pattern in which the malicious code creates and copies code blocks.

It is noted that the dynamic indicator(s) provided above are merely exemplary and that other dynamic indicator(s) may be determined.

Signature determiner 128 may also use the obtained snapshot(s) to locate and identify the deobfuscated malicious code in the memory of the targeted process. For example, signature determiner 128 may be configured to analyze the obtained snapshot(s) for one or more blocks of instructions that do not belong to any valid loaded module and that has execution privileges (e.g., that were located in a heap, and referred by return addresses in stack 104). Signature determiner 128 may also be configured to analyze the obtained snapshot(s) to identify one or more high-level languages (e.g., Visual Basic for Applications (VBA), Java, C++, etc.) used to generate the malicious code. For example, signature determiner 128 may analyze call stack frames and search for high-level language handling modules (e.g., VBE7 (VBE7!VarPtr+0x25b02), which is a high-level language handling module for VBA). Signature determiner 128 may use the high-level language handling modules to search for a high-level script in which the exploit was written and extract the script from the obtained snapshot(s) and/or memory 104. The script may be analyzed to determine other portions of memory 104 that can be extracted for additional analysis.

Signature determiner 128 may be further configured to create one or more signatures, which can be used to detect malicious code in addition to or in lieu of the techniques described in Subsection A. The signature(s) may be based on a combination of the static and/or dynamic indicator(s) described above. As an example, the signature(s) may be representative of a combination of one or more of (i) a sequence of bytes which appears during execution of the exploit being performed by the deobfuscated malicious code (e.g., 0xfc 0xe8 0x82 0x00 0x00 0x00 0x60 0x89 0xe5 0x31 0xc0 0x64 0x8b 0x50 0x30); (ii) the deobfuscation scheme used by the deobfuscator; (iii) a heap spraying pattern utilized by the deobfuscator and/or the deobfuscated malicious code; and/or (iv) the entropy of section(s) of memory after execution of the deobfuscated portion.

The signature(s) may also be representative of the deobfuscated malicious code itself. For example, in accordance with an embodiment, after the malicious code is suspended, signature determiner 128 may cause process 114 to be re-executed one or more additional times in order to identify invariant portions of malicious code, which are portions of code that remain unchanged across multiple executions of the code. Because most operating systems use defense mechanisms such as ASLR, the opcodes of the malicious program will contain random addresses (as well as the data stored in the stack and heap), meaning that the same program executed twice on the same machine will contain some differences in the code. For example, if a program contains x86 assembly command "MOV[12345678], 0", it will appear differently on another execution of the program because address [12345678] (which is an absolute address) will be changed to a different, randomized addresses. Such random addresses may be excluded from the signature(s), as they do not help in uniquely identifying the malicious code. Accordingly, the malicious code may be re-executed to determine what changed in subsequent execution(s). It is noted that other code analysis techniques may be used to determine invariant portions of the malicious code. In accordance with an embodiment, the signature(s) may include code near (e.g., before or after) or that includes the identified invariant addresses.

Signature determiner 128 may be configured to provide the determined signature(s) to a database (which may be located locally to and/or remotely from computer system 100). The database may comprise a plurality of determined signature(s) for various malicious code.

In accordance with an embodiment, the determined signature(s) may be used to identify, suspend and/or terminate malicious code in addition to, or in lieu of, the techniques described in Subsection A. For example, as shown in FIG. 1, computer system 100 may further include a memory scanner 130, which executes in main memory 104. Memory scanner 130 may be configured to analyze memory 104 (and/or the data structures maintained therein) to find signature(s) stored in and/or retrieved from the database while a malicious process is executing. Memory scanner 130 may be configured to analyze memory 104 responsive to one or more particular triggering events, thereby limiting the instances in which memory 104 is scanned to advantageously conserve computing resources. Examples of triggering events include, but are not limited to an access (e.g., a write operation, a read operation, etc.) to a particular registry hive of a registry maintained by operating system 110, an access to a particular file maintained by operating system 110, an access to a particular memory region of memory 104, etc.). The events may be determined by analyzing (e.g., monitoring the call stack, which may indicate procedure calls (for example, application programming interface (API) calls) used by the deobfuscated portion to perform the operations described above. It is noted that these triggering events are purely exemplary and that other triggering events may be used.

Figure 3:
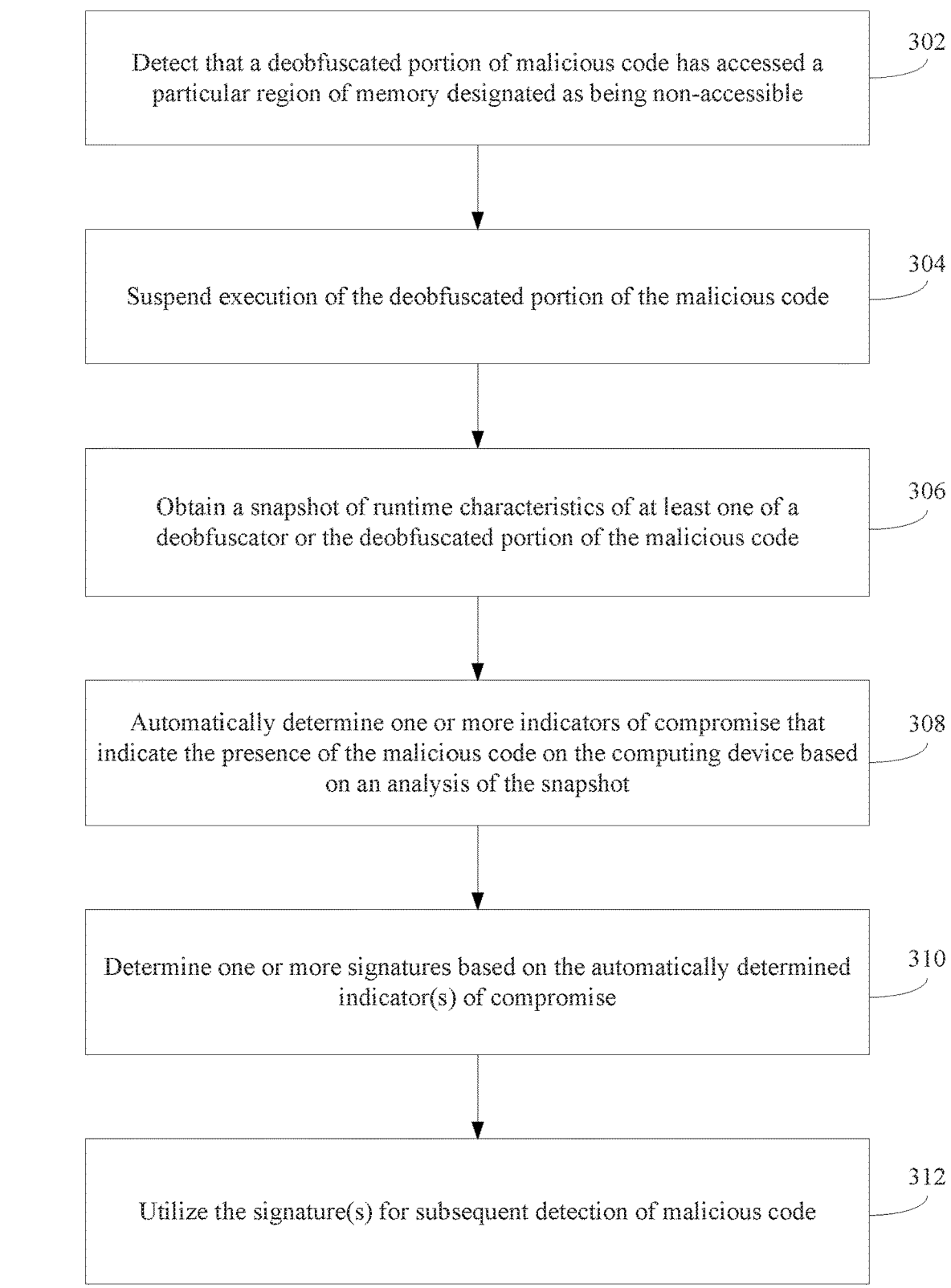
FIG. 3 depicts a flowchart of an example method for determining a signature for malicious code in accordance with an embodiment.
Figure 4:
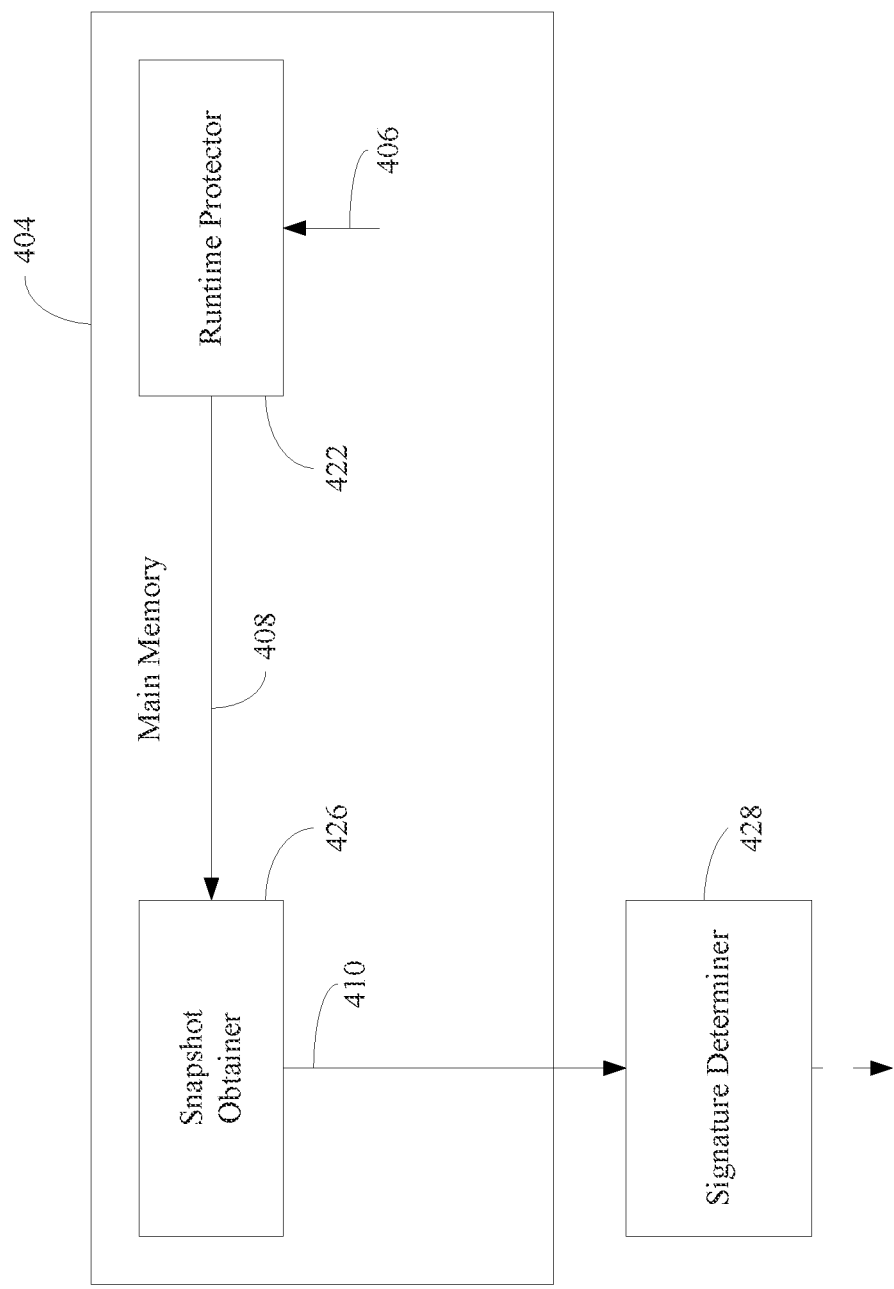
FIG. 4 shows a block diagram of a snapshot obtainer, a runtime protector, and a signature determiner in accordance with an embodiment.

Accordingly, in embodiments, system 100 may operate in various ways to determine a signature for malicious code. For example, FIG. 3 depicts a flowchart 300 of an example method for determining a signature for malicious code, according to an example embodiment. System 100 shown in FIG. 1 may operate according to flowchart 300. For illustrative purposes, flowchart 300 is described with reference to FIG. 4. FIG. 4 shows a block diagram 400 of a snapshot obtainer 426, a runtime protector 422, and a signature determiner 428, according to an embodiment. As shown in FIG. 4, snapshot obtainer 426 and runtime protector 422 are executing in main memory 404, which is an example of main memory 104, as shown in FIG. 1. Signature determiner 428 may be executing on a computing device other than the computing device in which main memory 404 is included. Alternatively, signature determiner 428 may also be executing in main memory 404 (e.g., as shown in FIG. 1.). Further structural and operational embodiments will be apparent to persons skilled in the relevant art(s) based on the discussion regarding flowchart 300 and main memory 404. Flowchart 300 and main memory 404 are described as follows.

Flowchart 300 begins with step 302. At step 302, access of a particular region of memory designated as being non-accessible by a deobfuscated portion of malicious code is detected, where the malicious code comprises a deobfuscator and an obfuscated portion, and where the deobfuscator is configured to deobfuscate the obfuscated portion to generate the deobfuscated portion during execution of the deobfuscator. For example, as shown in FIG. 4, runtime protector 422 detects that the deobfuscated portion of the malicious code has accessed a particular region of memory designated as being non-accessible (e.g., a morphed resource, such as a stub library). For instance, runtime protector 422 may receive an exception 406 from an exception handler (e.g., exception handler 124, as described above in reference with FIG. 1) that throws exception 406 when the deobfuscated portion attempts to access a particular non-accessible region of memory. Exception 406 may serve as a detection mechanism utilized by runtime protector 422 to determine that the deobfuscated portion has attempted to access a region of memory designated as being non-accessible.

In accordance with one or more embodiments, the malicious code is Just-in-Time compiled shellcode.

In accordance with one or more embodiments, the obfuscated portion of the malicious code is encrypted, and the deobfuscator is configured to decrypt the obfuscated portion.

At step 304, execution of the deobfuscated portion of the malicious code is suspended in response to the detecting step of step 302. For example, with reference to FIG. 4, runtime protector 422 suspends the deobfuscated portion of the malicious code is suspended in response to receiving exception 406.

At step 306, a snapshot of runtime characteristics of at least one of the deobfuscator or the deobfuscated portion of the malicious code is obtained in response to the suspending step of step 304. For example, with reference to FIG. 4, snapshot obtainer 426 may be configured to obtain a snapshot of runtime characteristics of at least one of the deobfuscator or the deobfuscated portion of the malicious code in response to runtime protector 422 suspending execution of the deobfuscated portion of the malicious code. Runtime protector 422 may provide an indicator 408 (indicating that execution of the malicious code has been suspended) to snapshot obtainer 426 that causes snapshot obtainer 426 to obtain the snapshot. The snapshot (i.e., snapshot 410) is provided to signature determiner 428.

In accordance with one or more embodiments, a deobfuscation scheme utilized by the deobfuscator to generate the deobfuscated portion of the malicious code is determined based on the analysis of the snapshot. For example, with reference to FIG. 4, signature determiner 428 may determine the deobfuscation scheme utilized by the deobfuscator to generate the deobfuscated portion of the malicious code based on analysis of snapshot 410.

In accordance with one or more embodiments, the runtime characteristics comprise at least one of register values at the time of suspending of the malicious code (e.g., a particular thread associated with the malicious code), a number of sequential function calls that occurred prior to suspending of the malicious code (e.g., a particular thread associated with the malicious code), a listing of library modules loaded at the time of suspending of the malicious code, a listing of file handles opened at the time of the suspending, or at least a partial memory dump at the time of suspending of the malicious code.

At step 308, indicator(s) of compromise that indicate the presence of the malicious code on the computing device are automatically determined based on an analysis of the snapshot. For example, with reference to FIG. 4, signature determiner 428 may automatically determine the indicator(s) of compromise that indicate the presence of the malicious code on the computing device based on an analysis of snapshot 410.

In accordance with one or more embodiments, the automatically determined indicator(s) of compromise comprise dynamic indicator(s) of compromise that include an access caused by the deobfuscated portion to one or more resources of an operating system executing on the computing device. The one or more resources may include at least one file or directory of a file system maintained by the operating system or an application programming interface (API) for accessing the file system, at least one registry key or value of a registry maintained by the operating system or an API for accessing the registry, at least one of a process or thread maintained by the operating system or an API for manipulating at least one of the process or thread, one or more explicitly-loaded modules or an API for explicitly loading the modules, one or more delay-loaded modules or an API for delay-loading the modules, one or more APIs for accessing one or more user privileges or profiles, one or more mutexes maintained by the operating system or an API for accessing the one or more mutexes, one or more environment variables maintained by the operating system or an API for accessing the one or more environment variables, one or more APIs for performing one or more cryptographic primitives, or network activity caused by the deobfuscated portion and performed by the computing device or an API for performing the network activity or for accessing network parameters utilized for performing the network activity, and a change in entropy of one or more code sections of the memory after execution of the deobfuscated portion of the malicious code.

In accordance with one or more embodiments, the automatically determined indicator(s) of compromise comprise static indicator(s) of compromise that include at least one string, metadata or byte sequence associated with at least one of the deobfuscator or the deobfuscated portion.

At step 310, one or more signatures are determined based on the automatically determined indicator(s) of compromise. For example, with reference to FIG. 4, signature determiner 428 may determine signature(s) based on the automatically determined indicator(s) of compromise.

In accordance with one or more embodiments, an invariant portion of the malicious code that remains unchanged across multiple executions of the malicious code is determined, the one or more signatures being based on the invariant portion of the malicious code. For example, with reference to FIG. 4, signature determiner 428 determines an invariant portion of the malicious code that remains unchanged across multiple executions of the malicious code.

In accordance with one or more embodiments, the signature(s) comprise the static indicator(s) of compromise.

At step 312, the signature(s) are utilized for subsequent detection of malicious code. Additional information regarding step 312 is described below with reference to FIGS. 5 and 6.

It is noted that that steps 308, 310 and 312 may be performed on the same machine that was used to perform steps 302, 304 and 306, or, alternatively, steps 308, 310 and 312 may each be performed on one or more different machines.

Figure 5:
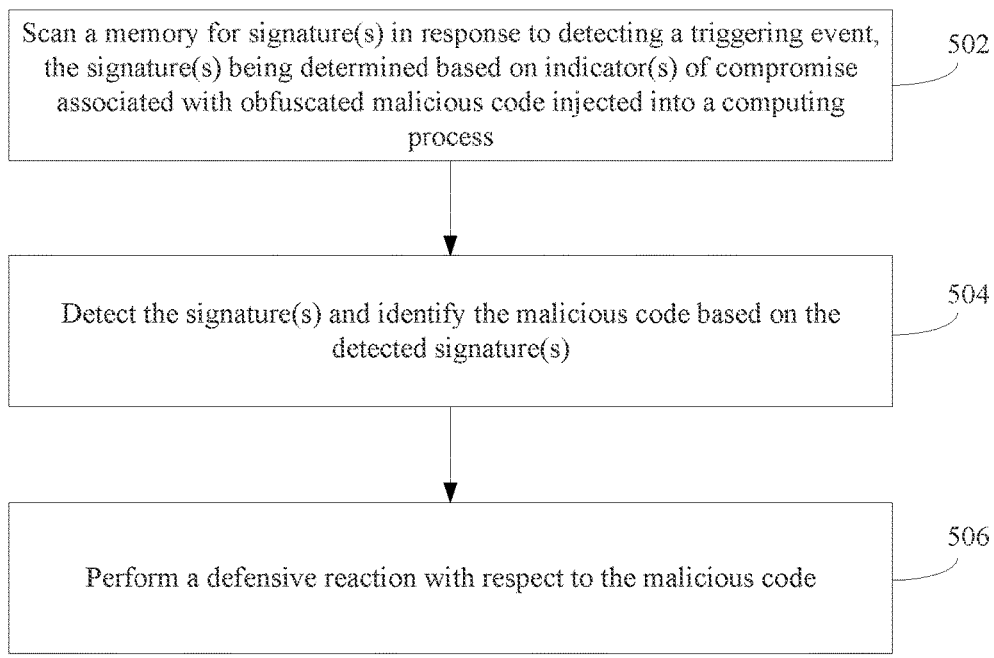
FIG. 5 depicts a flowchart of an example method for detecting and identifying malicious code and performing a defensive action by scanning a memory for malicious code signature(s) in accordance with an embodiment.
Figure 6:
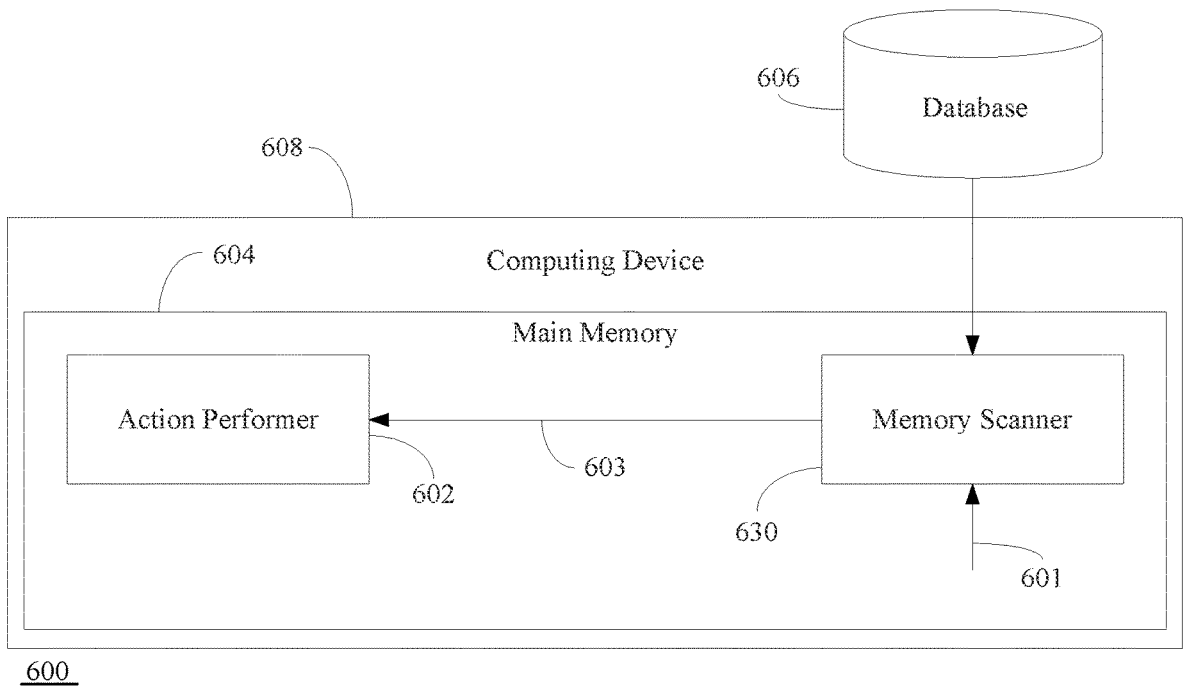
FIG. 6 shows a block diagram of a computing device in accordance with an embodiment.

As described above with reference to step 312, the signature(s) determined via step 310 may be subsequently used to detect and/or identify malicious code and perform a defensive action on computer systems in lieu of the process described in Subsection A. For example, FIG. 5 depicts a flowchart 500 of an example method for detecting and identifying malicious code and performing a defensive action by scanning a memory for malicious code signature(s), according to an example embodiment. System 100 shown in FIG. 1 may operate according to flowchart 500. For illustrative purposes, flowchart 500 is described with reference to FIG. 6. FIG. 6 shows a block diagram 600 of a computing device 608 comprising a main memory 604, according to an embodiment. Main memory 604 includes a memory scanner 630 and an action performer 602. Memory scanner 630 is an example of memory scanner 130, as shown in FIG. 1. Computing device 608 may comprise any of a wide variety of computing devices mentioned herein or otherwise known, including but not limited to a desktop computer, a tablet computer, a laptop computer, a smart phone, etc. However, these examples are not intended to be limiting and computing device 608 may include other types of devices other than those listed herein. Further structural and operational embodiments will be apparent to persons skilled in the relevant art(s) based on the discussion regarding flowchart 500 and main memory 604. Flowchart 500 and main memory 604 are described as follows.

Flowchart 500 begins with step 502. At step 502, a memory is scanned for signature(s) in response to detecting a triggering event. The signature(s) are determined based on indicator(s) of compromise associated with obfuscated malicious code injected into a computing process. For example, with reference to FIG. 6, memory scanner 630 may retrieve signature(s) from a database 606. Database 606 may store previously-determined signature(s) (e.g., signature(s) determined in accordance with flowchart 300). Database 606 may be stored on computing device 608 or, alternatively, may be stored in a computing device that is remotely located from computing device 608. Memory scanner 630 may initiate scanning operations in response to receiving a triggering event 601 caused by the malicious code.

In accordance with one or more embodiments, the triggering event is at least one of an access (e.g., a write operation, a read operation, etc.) to a particular registry hive of a registry maintained by an operating system of computing device 608, an access to a particular file stored on computing device 608, an access to a particular memory region of memory 604, etc.

At step 504, the signature(s) are detected, and the malicious code is identified based on the detected signature(s). For example, with reference to FIG. 6, memory scanner 630 may compare the information stored in memory 604 (and/or the data structures maintained therein) to the signature(s) retrieved from database 606. Each of the signature(s) may be associated with an identification (e.g., "Stagefright," "Conficker", "Sandworm," etc.) of the malicious code associated with the signature(s). If the signature(s) match, memory scanner 630 determines that malicious code has been detected and provides an indicator 603 to action determiner 602 that provides an identification of the malicious code detected.

At step 506, a defensive action is performed with respect to the malicious code. For example, with reference to FIG. 6, action performer 602 performs a defensive action based on the identified malicious code. For example, action performer 602 may maintain a mapping between identifications and defensive actions, and select the appropriate defense action based on the mapping. For instance, upon determining the identification is of a first type, action performer 602 may perform one or more first defensive actions. Upon determining the identification is of a second type, action performer 602 may perform one or more second defensive actions that are, at least in part, different than the first defensive action(s). In accordance with another embodiment, action performer 602 may provide several options as to how to handle the exploit for a user to select. Upon selection, action performer 602 may perform the defensive action corresponding to the selected option.

Examples of defensive actions include, but are not limited to, terminating the affected process or processes, disabling, or shutting down the affected system (i.e., computing device 608 or one or more components included therein (e.g., an operating system), rolling the affected process and/or the affected system back to a predetermined restore (or safe) point (e.g., the latest, ascertained restore point), restarting the affected process or processes of the affected system, trapping the malicious code in a sandboxed environment, preventing the malicious code from being loaded onto other machines, or a combination of any of these defensive actions and/or other defensive actions.

IV. Example Computer System Implementation

Figure 7:
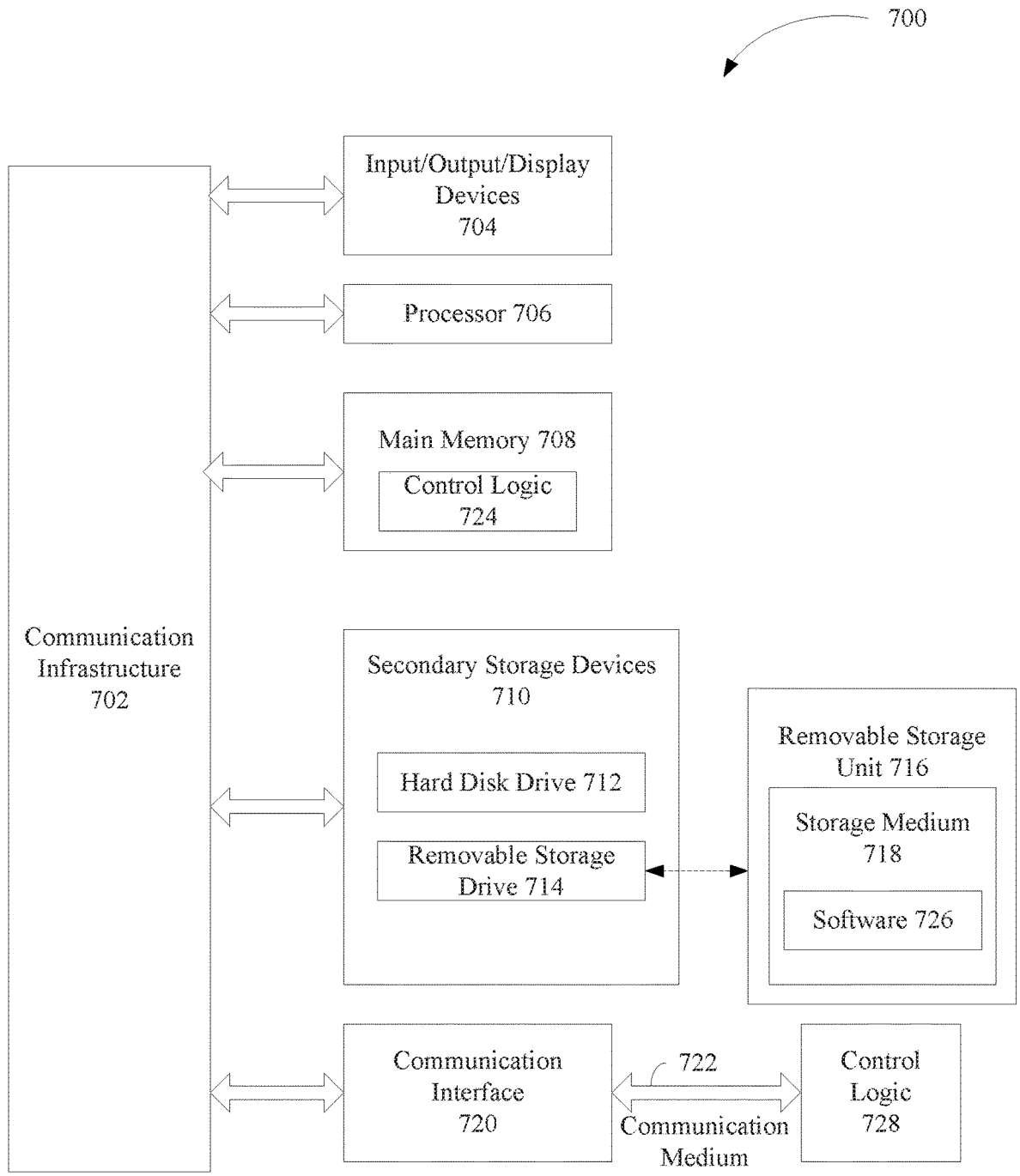
FIG. 7 depicts a block diagram of a computer system that may be configured to perform techniques disclosed herein.

The embodiments described herein, including systems, methods/processes, and/or apparatuses, may be implemented using well known processing devices, telephones (land line based telephones, conference phone terminals, smart phones and/or mobile phones), interactive television, servers, and/or, computers, such as a computer 700 shown in FIG. 7. It should be noted that computer 700 may represent computing devices linked to, processing devices, traditional computers, and/or the like in one or more embodiments. For example, computer system 100 of FIG. 1 and computing device 608 of FIG. 6, and any of the sub-systems, components, and/or models respectively contained therein and/or associated therewith, may be implemented using one or more computers 700.

Computer 700 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Computer 700 may be any type of computer, including a desktop computer, a server, etc.

Computer 700 includes one or more processors (also called central processing units, or CPUs), such as a processor 706. Processor 706 is connected to a communication infrastructure 702, such as a communication bus. In some embodiments, processor 706 can simultaneously operate multiple computing threads, and in some embodiments, processor 706 may comprise one or more processors.

Computer 700 also includes a primary or main memory 708, such as random access memory (RAM). Main memory 908 has stored therein control logic 724 (computer software), and data.

Computer 700 also includes one or more secondary storage devices 710. Secondary storage devices 710 include, for example, a hard disk drive 712 and/or a removable storage device or drive 714, as well as other types of storage devices, such as memory cards and memory sticks. For instance, computer 700 may include an industry standard interface, such a universal serial bus (USB) interface for interfacing with devices such as a memory stick. Removable storage drive 714 represents a floppy disk drive, a magnetic tape drive, a compact disk drive, an optical storage device, tape backup, etc.

Removable storage drive 714 interacts with a removable storage unit 716. Removable storage unit 716 includes a computer useable or readable storage medium 718 having stored therein computer software 726 (control logic) and/or data. Removable storage unit 716 represents a floppy disk, magnetic tape, compact disk, DVD, optical storage disk, or any other computer data storage device. Removable storage drive 714 reads from and/or writes to removable storage unit 716 in a well-known manner.

Computer 700 also includes input/output/display devices 704, such as touchscreens, LED and LCD displays, monitors, keyboards, pointing devices, etc.

Computer 700 further includes a communication or network interface 720. Communication interface 720 enables computer 700 to communicate with remote devices. For example, communication interface 720 allows computer 700 to communicate over communication networks or mediums 722 (representing a form of a computer useable or readable medium), such as LANs, WANs, the Internet, etc. Network interface 720 may interface with remote sites or networks via wired or wireless connections.

Control logic 728 may be transmitted to and from computer 900 via the communication medium 722.

Any apparatus or manufacture comprising a computer useable or readable medium having control logic (software) stored therein is referred to herein as a computer program product or program storage device. This includes, but is not limited to, computer 700, main memory 708, secondary storage devices 710, and removable storage unit 716. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media and signals transmitted over wired media. Embodiments are also directed to such communication media.

The techniques and embodiments described herein may be implemented as, or in, various types of devices. For instance, embodiments may be included in mobile devices such as laptop computers, handheld devices such as mobile phones (e.g., cellular and smart phones), handheld computers, and further types of mobile devices, desktop and/or server computers. A device, as defined herein, is a machine or manufacture as defined by 35 U.S.C. § 101. Devices may include digital circuits, analog circuits, or a combination thereof. Devices may include one or more processor circuits (e.g., central processing units (CPUs) (e.g., processor 906 of FIG. 9), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method performed by a computing device for identifying malicious code, the malicious code comprising deobfuscation code configured to deobfuscate an obfuscated portion of the malicious code to generate a deobfuscated portion during execution of the deobfuscation code, the method comprising:
designating a particular region of memory of the computing device as being non-accessible;
detecting that the deobfuscated portion of the malicious code has attempted to access the particular region of memory designated as being non-accessible;
suspending execution of the deobfuscated portion of the malicious code in response to the detecting;
obtaining a snapshot of runtime characteristics of at least one of the deobfuscation code or the deobfuscated portion of the malicious code in response to the suspending, wherein the runtime characteristics comprise one or more values loaded into one or more registers of a processor of the computing device at the time of suspending of a particular thread associated with the malicious code;
automatically determining one or more indicators of compromise that indicate the presence of the malicious code on the computing device based on an analysis of the snapshot; and
automatically creating one or more signatures based on the automatically determined one or more indicators of compromise, wherein the one or more signatures are suitable for subsequent detection of malicious code.

2. The method of claim 1, wherein the automatically determined one or more indicators of compromise comprise one or more dynamic indicators of compromise, wherein the dynamic indicators of compromise include at least one of:
an access caused by the deobfuscated portion to one or more resources of an operating system executing on the computing device; or
a change in entropy of one or more code sections of the memory after execution of the deobfuscated portion of the malicious code, and
wherein the one or more resources include at least one of:
at least one file or directory of a file system maintained by the operating system or an application programming interface (API) for accessing the file system;
at least one registry key or value of a registry maintained by the operating system or an API for accessing the registry;
at least one of a process or thread maintained by the operating system or an API for manipulating at least one of the process or thread;
one or more explicitly-loaded modules or an API for explicitly loading the modules;
one or more delay-loaded modules or an API for delay-loading the modules;
one or more APIs for accessing one or more user privileges or profiles;
one or more mutexes maintained by the operating system or an API for accessing the one or more mutexes;
one or more environment variables maintained by the operating system or an API for accessing the one or more environment variables;
one or more APIs for performing one or more cryptographic primitives; or
network activity caused by the deobfuscated portion and performed by the computing device or an API for performing the network activity or for accessing network parameters utilized for performing the network activity.

3. The method of claim 1, wherein the automatically determined one or more indicators of compromise comprise one or more static indicators of compromise that include at least one string, metadata or byte sequence associated with at least one of the deobfuscation code or the deobfuscated portion.

4. The method of claim 3, wherein the one or more signatures comprise the one or more static indicators of compromise.

5. The method of claim 1, further comprising:
determining a deobfuscation scheme utilized by the deobfuscation code to generate the deobfuscated portion of the malicious code based on the analyzing.

6. The method of claim 1, wherein the malicious code is Just-in-Time compiled shellcode.

7. The method of claim 1, wherein the obfuscated portion of the malicious code is encrypted, and wherein the deobfuscation code is configured to decrypt the obfuscated portion.

8. The method of claim 1, further comprising:
determining an invariant portion of the malicious code that remains unchanged across multiple executions of the malicious code, wherein the one or more signatures is based on the invariant portion of the malicious code.

9. The method of claim 1, wherein the runtime characteristics further comprise at least one of:
a number of sequential function calls that occurred prior to suspending of a particular thread associated with the malicious code;
a listing of library modules loaded at the time of the suspending;
a listing of file handles opened at the time of the suspending; or
at least a partial memory dump at the time of the suspending.

10. The method of claim 1, wherein the snapshot comprises a state of a process and/or an operating system at a time execution of the deobfuscated portion of the malicious code was suspended.

11. A computer system for identifying malicious code, the malicious code comprising deobfuscation code configured to deobfuscate an obfuscated portion of the malicious code to generate a deobfuscated portion during execution of the deobfuscation code, the computer system comprising:
one or more processing circuits; and
a memory coupled to the one or more processing circuits, the memory storing program code configured to be executed by the one or more processing circuits, the program code comprising:
a runtime protector configured to:
designate a particular region of memory of the computing device as being non-accessible;
detect that the deobfuscated portion of the malicious code has attempted to the particular region of the memory designated as being non-accessible; and
suspend execution of the deobfuscated portion of the malicious code in response to the detecting;
a snapshot obtainer configured to:
obtain a snapshot of runtime characteristics of at least one of the deobfuscation code or the deobfuscated portion of the malicious code in response to the suspending, wherein the runtime characteristics comprise one or more values loaded into one or more registers of a processor of the computing device at the time of suspending of a particular thread associated with the malicious code; and
a signature determiner configured to:
automatically determine one or more indicators of compromise that indicate the presence of the malicious code on the computer system based on an analysis of the snapshot; and
automatically create one or more signatures based on the automatically determined one or more indicators of compromise, wherein the one or more signatures are suitable for subsequent detection of malicious code.

12. The system of claim 11, wherein the automatically determined one or more indicators of compromise comprise one or more dynamic indicators of compromise, wherein the dynamic indicators of compromise include at least one of:
an access caused by the deobfuscated portion to one or more resources of an operating system executing on the computing device; or
a change in entropy of one or more code sections of the memory after execution of the deobfuscated portion of the malicious code, and
wherein the one or more resources include at least one of:
at least one file or directory of a file system maintained by the operating system or an application programming interface (API) for accessing the file system;
at least one registry key or value of a registry maintained by the operating system or an API for accessing the registry;
at least one of a process or thread maintained by the operating system or an API for manipulating at least one of the process or thread;
one or more explicitly-loaded modules or an API for explicitly loading the modules;
one or more delay-loaded modules or an API for delay-loading the modules;
one or more APIs for accessing one or more user privileges or profiles;
one or more mutexes maintained by the operating system or an API for accessing the one or more mutexes;
one or more environment variables maintained by the operating system or an API for accessing the one or more environment variables;
one or more APIs for performing one or more cryptographic primitives; or
network activity caused by the deobfuscated portion and performed by the computing device or an API for performing the network activity or for accessing network parameters utilized for performing the network activity.

13. The system of claim 11, wherein the automatically determined one or more indicators of compromise comprise one or more static indicators of compromise that include at least one string, metadata or byte sequence associated with at least one of the deobfuscation code or the deobfuscated portion.

14. The system of claim 13, wherein the one or more signatures comprise the one or more static indicators of compromise.

15. The system of claim 11, wherein a deobfuscation scheme utilized by the deobfuscation code to generate the deobfuscated portion of the malicious code is determined based on the analysis of the snapshot.

16. The system of claim 11, wherein the malicious code is Just-in-Time compile shellcode.

17. The system of claim 11, wherein the obfuscated portion of the malicious code is encrypted, and wherein the deobfuscation code is configured to decrypt the obfuscated portion.

18. The system of claim 11, wherein an invariant portion of the malicious code that remains unchanged across multiple executions of the malicious code is determined, wherein the one or more signatures is based on the invariant portion of the malicious code.

19. The system of claim 11, wherein the runtime characteristics further comprise at least one of:
a number of sequential function calls that occurred prior to suspending of a particular thread associated with the malicious code;
a listing of library modules loaded at the time of the suspending;
a listing of file handles opened at the time of the suspending; or
at least a partial memory dump at the time of the suspending.

20. The system of claim 11, wherein the snapshot comprises a state of a process and/or an operating system at a time execution of the deobfuscated portion of the malicious code was suspended.

21. A non-transitory computer-readable storage medium having program instructions recorded thereon that, when executed by at least one processor circuit of a computing device, perform a method for identifying malicious code, the malicious code comprising deobfuscation code configured to deobfuscate an obfuscated portion of the malicious code to generate a deobfuscated portion during execution of the deobfuscation code, the method comprising:
designating a particular region of memory of the computing device as being non-accessible;
detecting that the deobfuscated portion of the malicious code has attempted to access the particular region of memory designated as being non-accessible;
suspending execution of the deobfuscated portion of the malicious code in response to the detecting;
obtaining a snapshot of runtime characteristics of at least one of the deobfuscation code or the deobfuscated portion of the malicious code in response to the suspending, wherein the runtime characteristics comprise one or more values loaded into one or more registers of a processor of the computing device at the time of suspending of a particular thread associated with the malicious code;
automatically determining one or more indicators of compromise that indicate the presence of the malicious code on the computing device based on an analysis of the snapshot; and
automatically creating one or more signatures based on the automatically determined one or more indicators of compromise, wherein the one or more signatures are suitable for subsequent detection of malicious code.

22. The non-transitory computer-readable storage medium of claim 19, wherein the automatically determined one or more indicators of compromise comprise one or more dynamic indicators of compromise, wherein the dynamic indicators of compromise include at least one of:
an access caused by the deobfuscated portion to one or more resources of an operating system executing on the computing device; or a change in entropy of one or more code sections of the memory after execution of the deobfuscated portion of the malicious code, and wherein the one or more resources include at least one of:
- at least one file or directory of a file system maintained by the operating system or an application programming interface (API) for accessing the file system;
- at least one registry key or value of a registry maintained by the operating system or an API for accessing the registry;
- at least one of a process or thread maintained by the operating system or an API for manipulating at least one of the process or thread;
- one or more explicitly-loaded modules or an API for explicitly loading the modules;
- one or more delay-loaded modules or an API for delay-loading the modules;
- one or more APIs for accessing one or more user privileges or profiles;
- one or more mutexes maintained by the operating system or an API for accessing the one or more mutexes;
- one or more environment variables maintained by the operating system or an API for accessing the one or more environment variables;
- one or more APIs for performing one or more cryptographic primitives; or
- network activity caused by the deobfuscated portion and performed by the computing device or an API for performing the network activity or for accessing network parameters utilized for performing the network activity.

* * * * *